United States Patent
Ge (10) Patent No.: US 9,688,276 B2
(45) Date of Patent: Jun. 27, 2017

(54) SYSTEM AND METHOD FOR CONTROLLING ENGINE AND TRANSMISSION SYSTEM OF A MACHINE

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 91 days.

(21) Appl. No.: 14/631,889

(22) Filed: Feb. 26, 2015

(65) Prior Publication Data

US 2016/0251827 A1 Sep. 1, 2016

(51) Int. Cl.
| | |
|---|---|
| F02D 41/04 | (2006.01) |
| B60W 30/18 | (2012.01) |
| E02F 9/22 | (2006.01) |
| E02F 9/26 | (2006.01) |
| F02D 41/02 | (2006.01) |
| F02D 41/14 | (2006.01) |
| F02D 31/00 | (2006.01) |
| F16H 61/47 | (2010.01) |

(52) U.S. Cl.
CPC ........... *B60W 30/18* (2013.01); *E02F 9/2246* (2013.01); *E02F 9/2253* (2013.01); *E02F 9/265* (2013.01); *F02D 31/001* (2013.01); *F02D 41/021* (2013.01); *F02D 41/1402* (2013.01); *F16H 61/47* (2013.01)

(58) Field of Classification Search
None
See application file for complete search history.

(56) References Cited

U.S. PATENT DOCUMENTS

| | | | |
|---|---|---|---|
| 6,289,873 B1 | 9/2001 | Dunsworth | |
| 6,901,324 B2 | 5/2005 | Rose et al. | |
| 6,944,532 B2 | 9/2005 | Bellinger | |
| 8,060,284 B2 | 11/2011 | Hendryx | |
| 8,175,780 B2 | 5/2012 | Quinn et al. | |
| 8,532,889 B2 | 9/2013 | Demarco et al. | |
| 8,560,189 B2 | 10/2013 | Tanaka et al. | |
| 8,606,474 B2 | 12/2013 | Guo et al. | |
| 8,684,886 B2 | 4/2014 | Roberge et al. | |
| 8,718,884 B2 | 5/2014 | Hou | |
| 8,744,707 B2 | 6/2014 | Li et al. | |
| 2003/0216847 A1* | 11/2003 | Bellinger | B60W 30/1819 701/51 |

(Continued)

FOREIGN PATENT DOCUMENTS

WO  2012177187  12/2012

*Primary Examiner* — Truc M Do
*Assistant Examiner* — Jess Whittington
(74) *Attorney, Agent, or Firm* — James S. Bennin (57) ABSTRACT

A method of controlling a machine is disclosed. The method includes receiving signals indicative of multiple operating parameters of the machine. The method further includes determining a current machine operating pattern based on the multiple operating parameters. The method further includes comparing the determined current machine operating pattern with reference to a plurality of predefined machine operating patterns and controlling at least one of a speed of an engine and an output speed of a variable speed member based on the comparison of the determined current machine operating pattern. The variable speed member is drivably coupled to the engine of the machine.

13 Claims, 5 Drawing Sheets

(56) References Cited

U.S. PATENT DOCUMENTS

| | | | |
|---|---|---|---|
| 2005/0071066 A1* | 3/2005 | Rose | B60W 10/06 701/54 |
| 2005/0071067 A1* | 3/2005 | Guven | B60K 6/46 701/54 |
| 2007/0204605 A1* | 9/2007 | Itoga | B60W 10/06 60/433 |
| 2008/0306664 A1* | 12/2008 | Guo | F16H 61/66 701/54 |
| 2008/0319618 A1* | 12/2008 | Sjogren | F02D 29/02 701/50 |
| 2010/0161186 A1* | 6/2010 | Quinn | B60W 10/06 701/54 |
| 2011/0040458 A1 | 2/2011 | Nakagawa et al. | |
| 2011/0277577 A1* | 11/2011 | Roberge | B60W 10/06 74/473.1 |
| 2013/0288848 A1 | 10/2013 | Carter et al. | |

* cited by examiner

SYSTEM AND METHOD FOR CONTROLLING ENGINE AND TRANSMISSION SYSTEM OF A MACHINE

TECHNICAL FIELD

The present disclosure relates to a system and a method for controlling an engine and a transmission system of a machine.

BACKGROUND

Machines, such as off-highway vehicle or on-highway vehicle include an engine and a transmission system, such as continuously variable transmission (CVT) coupled to the engine for driving the machine. Nowadays, reduction of emission is given priority while designing the machine. Especially, measures taken for controlling reduction of $CO_2$ emission are also applied on off-highway machines. For reduction of $CO_2$ emission, optimization of the engine may not give desired results; hence increasing efficiency of the transmission system is also an important aspect. Generally, the CVT is used for increasing the efficiency of the transmission system. Although, various types of CVTs are used in machines, the type most often found on larger machines is the parallel path hydrostatic transmission. This type of transmission employs a gear train that receives an input from the engine as well as from a hydraulic motor with continuously variable output. By smoothly varying a speed of the hydraulic motor, final output of the gear train may be continuously varied over a wide range of speeds and/or torque.

The CVT may allow the engine to run at a constant speed. Further, the CVTs may be capable of providing a desired output torque at any speed within its operating range by continuously changing a ratio of the transmission system. However, hydraulic elements used in the hydrostatic CVTs may apply load on the engine, which may cause engine "stalling" or "lugging". In one example, engine speed variation may be minimized by controlling the ratio of the transmission system. The ratio is controlled based on an error signal determined by comparing an actual speed of the engine to a desired speed of the engine. However, the transmission system needs to be precisely controlled in response to change in load. In another example, a power increase demand may be met by the engine by controlling delivery of fuel in the engine via a fuel governor. The fuel governor is controlled based on the error signal.

U.S. Pat. No. 8,532,889 (the '889 patent) discloses a closed-loop method to control the torque of hydraulic variator. According to '889 patent, torque control mappings are predetermined and become inaccurate due to operating environment variations, machine variations, tolerance changes, and so on. The torque control system further adds a calculated pressure supplement value to each map value before each application of that map value to improve the correlation between the desired or expected and actual output torque of the variator. The effectiveness or accuracy of the disclosed method in '889 patent heavily depends on the determination of the supplement value. The pressure supplement value is actually determined by multiplying the error value by a gain factor, and hence gain factors will directly affect the system performance. The optimized gain factors are operating state dependent, and even may change due to the components wearing. The effectiveness of the closed-loop control heavily depends on the accuracy and effectiveness of the gain selection and optimization. The '889 patent does not discloses further contents regarding gain optimization.

SUMMARY OF THE DISCLOSURE

In one aspect of the present disclosure, a method of controlling a machine is provided. The method includes receiving signals indicative of multiple operating parameters of the machine. The method further includes determining a current machine operating pattern based on the multiple operating parameters. The method further includes comparing the determined current machine operating pattern with reference to a plurality of predefined machine operating patterns and controlling at least one of a speed of an engine and an output speed of a variable speed member based on the comparison of the determined current machine operating pattern. The variable speed member is drivably coupled to the engine of the machine.

In another aspect of the present disclosure, a control system for a machine is provided. The control system includes a first controller in communication with an engine. The first controller is configured to control a speed of the engine based on supply of fuel. The control system further includes a second controller in communication with a variable speed member. The second controller is configured to control an output speed of the variable speed member. The variable speed member is drivably coupled to the engine. The control system further includes an adaptive adjustment module configured to be in communication with the first controller and the second controller. The adaptive adjustment module configured to receive signals indicative of multiple operating parameters of the machine and determine a current machine operating pattern based on the multiple operating parameters. The adaptive adjustment module further configured to compare the determined current machine operating pattern with reference to a plurality of predefined machine operating patterns. The adaptive adjustment module further configured to control at least one of the speed of the engine and the output speed of the variable speed member based on the comparison of the determined current machine operating pattern.

In yet another aspect of the present disclosure, a machine is provided. The machine includes an engine and a transmission system drivably coupled to the engine. The transmission system includes a variable speed member coupled parallel to the engine. The machine further includes a control system. The control system includes a first controller in communication with the engine. The first controller is configured to control a speed of the engine based on supply of fuel. The control system further includes a second controller in communication with the variable speed member. The second controller is configured to control an output speed of the variable speed member. The control system further includes an adaptive adjustment module configured to be in communication with the first controller and the second controller. The adaptive adjustment module configured to receive signals indicative of multiple operating parameters of the machine and determine a current machine operating pattern based on the multiple operating parameters. The adaptive adjustment module further configured to compare the determined current machine operating pattern with reference to a plurality of predefined machine operating patterns. The adaptive adjustment module further configured to control at least one of the speed of the engine and the output speed of the variable speed member based on the comparison of the determined current machine operating pattern.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
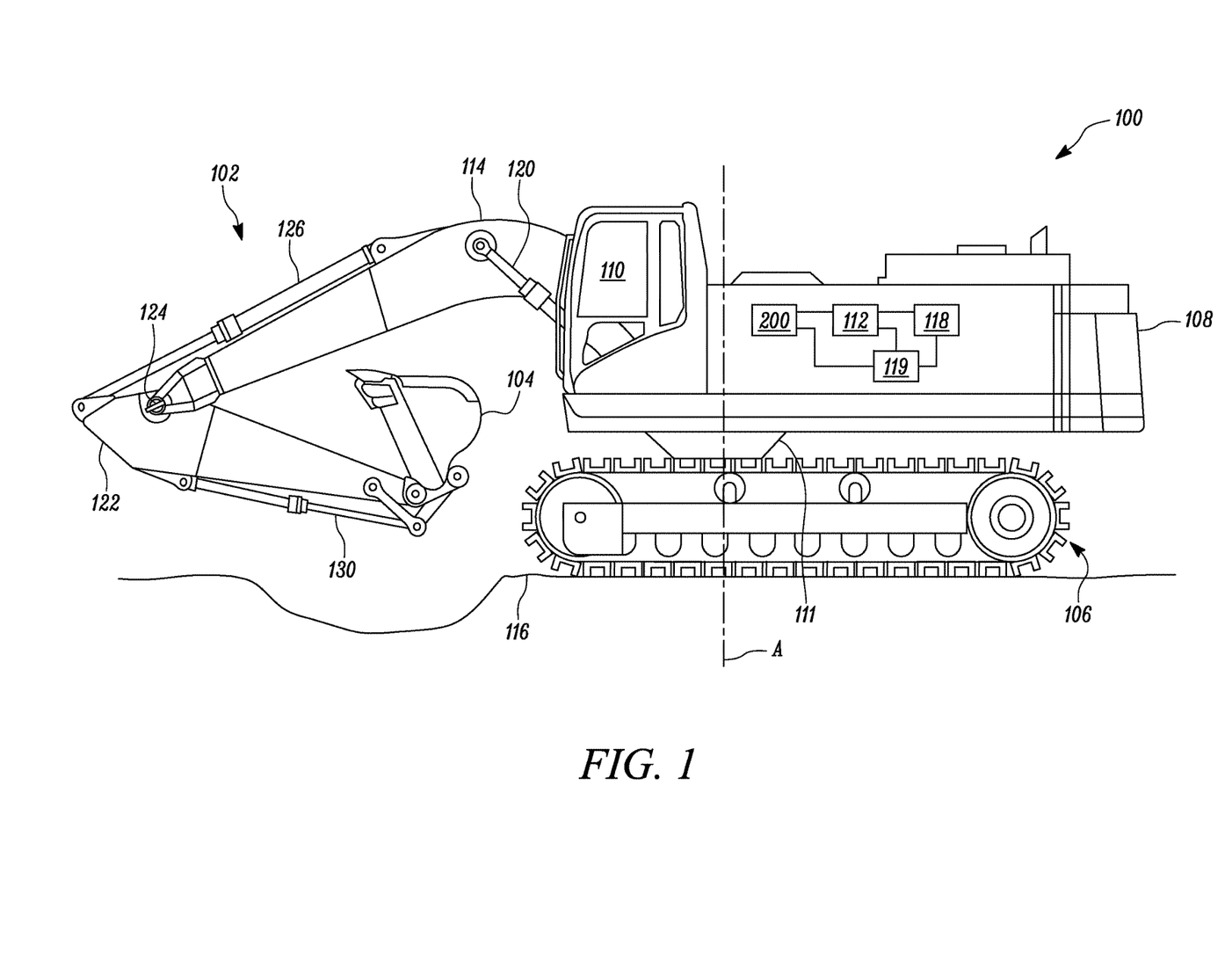
FIG. 1 is a side view of a machine, according to an embodiment of the present disclosure.

FIG. 1 shows a side view of a machine 100, according to an embodiment of the present disclosure. In the illustrated embodiment, the machine 100 is an excavator. The excavator may perform earth moving operation based on repetitive work cycle that will be described in detail below. The machine 100 may be any machine that may perform work based on repetitive work cycle for the purpose of construction, mining, quarrying, and so on.

The machine 100 includes an implement system 102 for performing various works, such as digging, leveling, etc., via a bucket 104. The implement system 102 will be described in detail hereinafter. The machine 100 further includes a chassis 108 and an operator cab 110 rotatably supported on a ground engaging base 106 by a turret 111. The turret 111 is rotatable about a vertical axis 'A'. The operator cab 110 may include one or more operator interface devices configured to receive input from an operator. The input may be indicative of a desired operation of the implement system 102 and/or the machine 100. The machine 100 further includes an engine 112 for providing power to the ground engaging base 106 and the implement system 102. The engine 112 may be, for example, a diesel engine, a gasoline engine, a gaseous fuel engine, or any other type of combustion engine known in the art.

In the illustrated embodiment, the ground engaging base 106 may include a pair of tracks. However, in another embodiment, the ground engaging base 106 may include a plurality of wheels. The ground engaging base 106 is drivably coupled to a transmission system 118 of the machine 100. The transmission system 118 may be drivably coupled to the engine 112 for receiving power therefrom. The transmission system 118 further includes a variable speed member 119 drivably coupled to the engine 112 for driving the ground engaging base 106 at various speeds and torques. The variable speed member 119 will be described in more detail later.

As illustrated in FIG. 1, the implement system 102 includes a boom member 114 pivotally connected to the chassis 108. The boom member 114 is moved relative to a ground surface 116 using a first hydraulic actuator 120. The first hydraulic actuator 120 is coupled between the chassis 108 and the boom member 114. The boom member 114 is further pivotally connected to a stick member 122 via a pin member 124. A second hydraulic actuator 126 is coupled between the boom member 114 and the stick member 122 to move the stick member 122 relative to the boom member 114. The bucket 104 is pivotally connected to the stick member 122. A third hydraulic actuator 130 is coupled between the stick member 122 and the bucket 104 to move the bucket 104 relative to the stick member 122.

The machine 100 further includes a hydraulic system (not shown) in communication with the engine 112. The hydraulic system may supply pressurized fluid to the implement system 102 and various other systems, such as a steering system and a brake system of the machine 100.

An exemplary work cycle of the machine 100 is described below. The work cycle of the machine 100 may be divided into a dig segment, a lift segment, a move up a steep grade segment, a swing segment, a dump segment, a move down a steep grade segment and another swing segment. However, in another embodiment, the work cycle of the machine 100 may be divided into more than or less than seven segments based on application of the machine 100. Such work cycle of the machine 100 may be repeated to perform various works, such as earth moving operation. The above segments are provided merely as examples for the purpose of the present disclosure.

In an example, the machine 100 may start with a dig segment. In the dig segment, the boom member 114, the stick member 122 and the bucket 104 may be actuated by the first, second and third hydraulic cylinders 120, 126, 130, respectively, to dig the ground surface 116. The bucket 104 may be partially or fully filled with material, such as soil. Furthermore, in the lift segment, the boom member 114, the stick member 122 and the bucket 104 may be moved to lift the material contained in the bucket 104. In an example, the machine 100 may have to dump the material in a truck (not shown). In such a case, the bucket 104 may be raised to a level beyond a payload carrier of the truck. Further, in the move up steep grade segment, the machine 100 may move forward or backward in order to dump the material in the payload carrier. Further, in the swing movement, the chassis 108 of the machine 100 may swing by the turret 111 along the vertical axis 'A' to move the implement system 102 proximate to the payload carrier. Further, in the dump segment, the material contained in the bucket 104 may be dumped in the payload carrier. Further, the machine 100 may move down the steep grade and the chassis 108 of the machine 100 may swing back to continue with next dig segment. Thus, the work cycle including the above seven segments is repeated to continue the earth moving operation.

In each of the segments, load acting on the machine 100 varies based on actuation of the implement system 102 and the movement of the machine 100 in steep grade. Further, speed of the engine 112 and output speed of the variable speed member 119 may also vary depending on the type of segment. In an example, the dig and lift segments may require more power from the engine 112 than the swing and dump segments. Hence, the engine 112 may be controlled to avoid overshooting of the engine speed during the dump segment. In another example, the dig segment and the lift segment may directly require more power from the engine 112 than the variable speed member 119 of the transmission system 118. However, the move up the steep grade segment may directly require more power from the variable speed member 119 than the engine 112. Thus, the speed of the engine 112 and the output speed of the variable speed member 119 may be controlled by a control system 200, which will be described in detail with reference to FIG. 2, to improve productivity and efficiency of the machine 100. Each segment of the work cycle is hereinafter referred as 'the machine operating pattern'.

Figure 2:
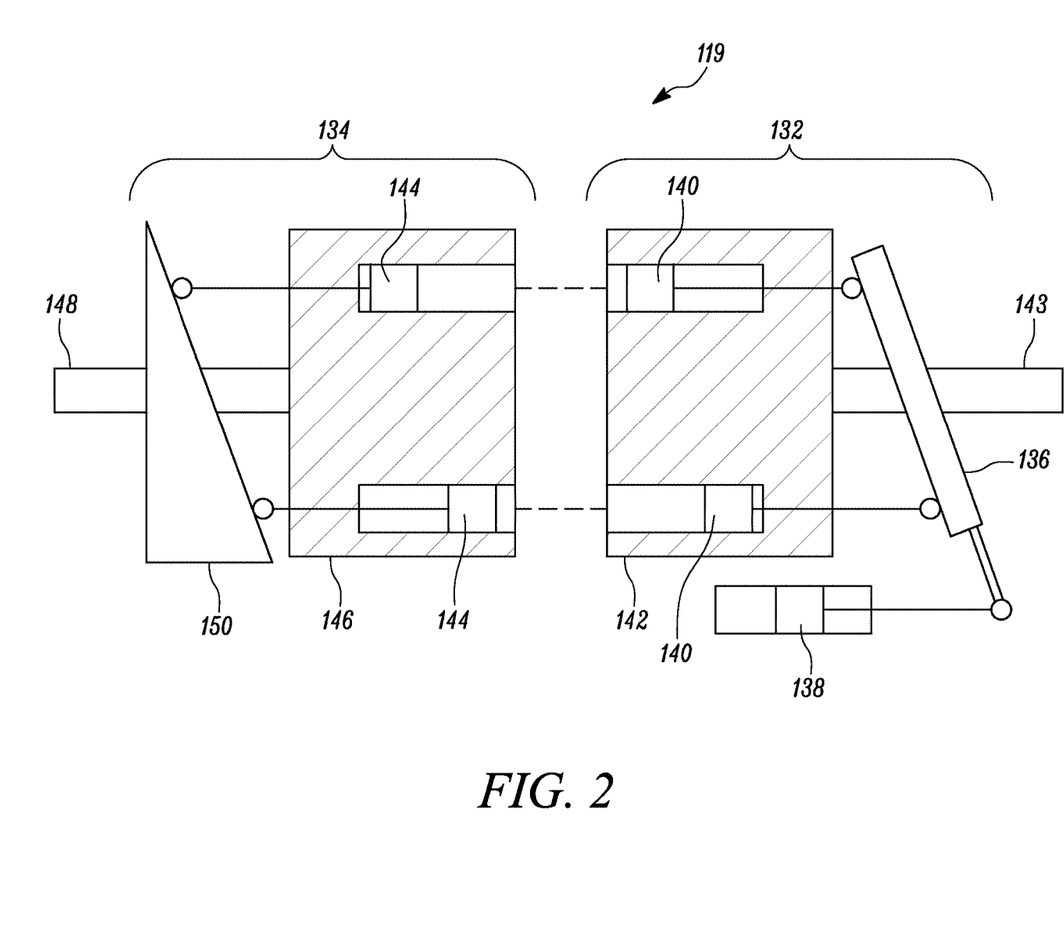
FIG. 2 is a schematic view of a variable speed member 119 associated with a transmission system of the machine.

FIG. 2 is a schematic view of the variable speed member 119 of the transmission system 118. In the illustrated embodiment, the variable speed member 119 may be a hydrostatic continuously variable transmission (CVT). The variable speed member 119 includes a hydraulic pump 132 and a hydraulic motor 134. The hydraulic pump 132 may receive pressurized fluid from the hydraulic system. The hydraulic pump 132 further includes a variable swash plate 136 actuated by a swash plate actuator 138. A plurality of pistons 140 in respective chambers ride on the variable swash plate 136 via sliding contacts, such that a range of movement of the plurality of pistons 140 is controlled by the angle of the variable swash plate 136. The chambers are defined in a pump carrier 142 that is rotated via an input shaft 143. The input shaft 143 may be drivably coupled to the engine 112.

The hydraulic motor 134 includes a plurality of pistons 144 in respective chambers defined in a motor carrier 146. The motor carrier 146 rotates an output shaft 148. The plurality of pistons 144 are slidably engaged upon a fixed swash plate 150. It will be appreciated that an angle of the fixed swash plate 150 may also variable, so as to allow a variable displacement. The chambers of the pistons 140 of the hydraulic pump 132 are in fluid communication with the chambers of the pistons 144 of the hydraulic motor 134 via hydraulic fluid that fills the chambers and intervening conduits (not shown). As the angle of the variable swash plate 136 is varied, an amount of fluid displaced by the pistons 140 of the hydraulic pump 132 varies. Because of these interrelationships, torque varies with a net force applied to the variable swash plate 136 and an output speed of the hydraulic motor 134 varies with the angle of the variable swash plate 136. In various embodiments, the variable speed member 119 may be a hydrostatic transmission system, infinite variable transmission system (IVT) or any type of automatic transmission systems known in the art.

Figure 3:
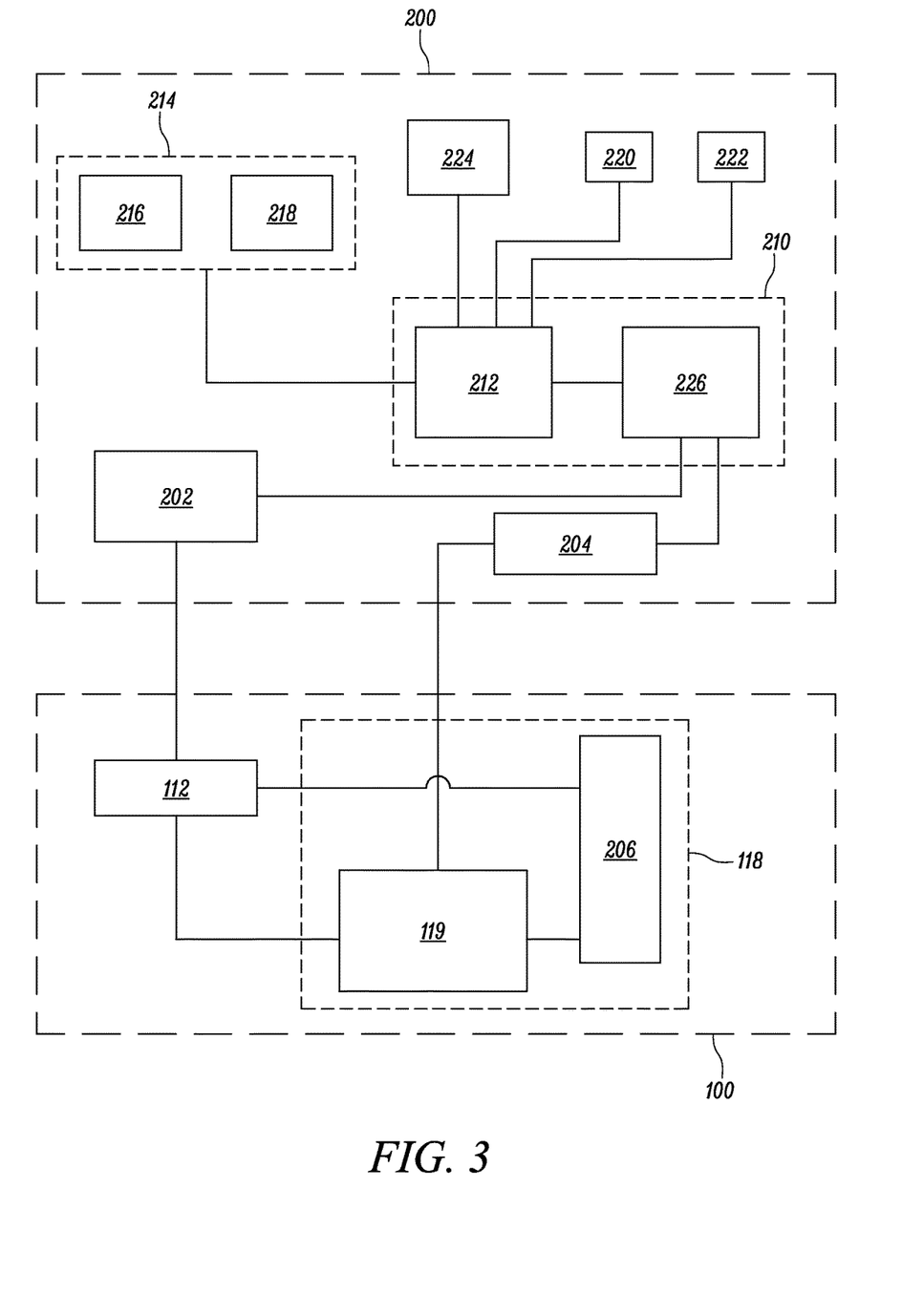
FIG. 3 is a block diagram of a control system associated with an engine and a variable speed member of the machine, according to an embodiment of the present disclosure.

FIG. 3 shows a block diagram of the control system 200 associated with the engine 112 and the variable speed member 119 of the machine 100, according to an embodiment of the present disclosure. The control system 200 includes a first controller 202 configured to be in communication with the engine 112. The first controller 202 is further configured to control speed of the engine 112. In an embodiment, the first controller 202 may be in communication with a fuel governor (not shown) of the engine 112. The fuel governor may be operably coupled with one or more fuel injectors associated with one or more cylinders of the engine 112. The first controller 202 may be configured to control a supply of fuel in the one or more cylinders of the engine 112 to control the speed of the engine 112. The fuel governor may be actuated based on input command signals receive from the first controller 202. However, in various embodiments, the first controller 202 may be in communication with other systems, such as fuel supply system, apart from the fuel governor to control the speed of the engine 112.

The control system 200 further includes a second controller 204 configured to be in communication with the variable speed member 119 of the transmission system 118. Specifically, the second controller 204 is configured to be in communication with the swash plate actuator 138 to set the angular position of the variable swash plate 136 to control the output speed and torque of the variable speed member 119. The variable speed member 119 is coupled parallel to the engine 112. Further, the engine 112 and the variable speed member 119 may be coupled to a final drive 206 of the machine 100. The output shaft 148 of the hydraulic motor 134 is operably coupled to the final drive 206. In an example, the final drive 206 may be a planetary drive member. The final drive 206 may be further drivably coupled to the ground engaging base 106 of the machine 100.

The control system 200 further includes an adaptive adjustment module 210 configured to be in communication with the first controller 202 and the second controller 204. The adaptive adjustment module 210 is further configured to control the speed of the engine 112 and the output speed of the variable speed member 119 based on actuation of the first controller 202 and the second controller 204, respectively. The adaptive adjustment module 210 includes a pattern recognition module 212 configured to be in communication with multiple sensors to receive signals indicative of multiple operating parameters of the machine 100. In the illustrated embodiment, the pattern recognition module 212 is configured to be in communication with a load sensing module 214. The load sensing module 214 includes at least a grade sensor 216 configured to generate signals indicative of a position the machine 100 relative to the ground surface 116. In an example, the load sensing module 214 may include a first grade sensor disposed in a front axle of the machine 100 and a second grade sensor disposed in a rear axle of the machine 100. The first and the second grade sensors together may be configured to generate signals indicative of the position of the machine 100 relative to the ground surface 116. The signals generated by the first and the second grade sensors may be compared to check whether the machine 100 is moving up or moving down relative to the ground surface 116. The load sensing module 214 further includes at least a load sensor 218 configured to generate signals indicative of a load carried by the machine 100 during various machine operating patterns. For example, in the lift segment, the load sensor 218 may be configured to generate signals indicative of the amount of material contained in the bucket 104.

The pattern recognition module 212 receives the signals generated by the grade sensors 216 and the load sensor 218 to determine a load acting on the machine 100. In an example, based on various parameters including, but not limited to, moving direction in steep grade of the ground surface 116 and gross weight of the machine 100, the load acting on the machine 100 may be calculated. If the machine 100 moves uphill, then magnitude of the load may be considered to be positive. Similarly, if the machine 100 moves downhill, then magnitude of the load may be considered to be negative. However, in another embodiment, if the machine 100 moves uphill, then the magnitude of the load may be considered to be negative, and if the machine 100 moves downhill, then the magnitude of the load may be considered to be positive.

The pattern recognition module 212 is further configured to be in communication with at least an engine sensor 220. The engine sensor 220 is configured to generate signals indicative of an actual speed of the engine 112. The engine sensor 220 may also be configured to generate signals indicative of a direction of rotation of an engine output shaft (not shown) coupled to the final drive 206. In an example, the engine sensor 220 may be associated with a crank shaft, a flywheel or any other rotating components of the engine 112. However, in various embodiments, the engine sensor 220 may be disposed at any location of the machine 100 to generate signals indicative of the actual speed of the engine 112.

The pattern recognition module 212 is further configured to be in communication with at least a transmission sensor 222. The transmission sensor 222 is configured to generate signals indicative of the output speed of the variable speed member 119 and operating state of the variable speed member 119. The transmission sensor 222 may be associated with various operating parameters of the variable speed member 119 including, but not limited to, a displacement of the hydraulic pump 132, a position of the swash plate, a speed of the hydraulic pump 132, a pressure of fluid flow, a speed of the hydraulic motor 134 and a displacement of the hydraulic motor 134. However, in various embodiments, the transmission sensor 222 may be associated with any rotating component of the transmission system 118 to generate signals indicative of the speed of the variable speed member 119. In another embodiment, the transmission sensor 222 may be configured to generate signals indicative of operating state of the variable speed member 119 based on the operating parameters. Thus, the pattern recognition module 212 is configured to determine the load acting on the machine 100 and a current machine operating pattern (i.e. at time $T_0$) based on the signals received from the grade sensor 216, the load sensor 218, the engine sensor 220 and the transmission sensor 222.

In an embodiment, the control system 200 may further include a data storage module 224 configured to be in communication with the pattern recognition module 212. In an embodiment, the data storage module 224 comprises a non-transitory machine readable medium. The data storage module 224 may be configured to store a plurality of predefined machine operating patterns. In an embodiment, the plurality of predefined machine operating patterns may correspond to various machine operating patterns determined in a desired time period prior to the time $T_0$ (for example, $T_{-5}$ to $T_0$). In various examples, the plurality of predefined machine operating patterns may be defined based on historical data of various machine operating patterns. The plurality of machine operating patterns may also be defined based on real time field data or lab experimental data. In another embodiment, the plurality of predefined machine operating patterns may be stored in the pattern recognition module 212.

The adaptive adjustment module 210 further includes a powertrain controller 226 in communication with the pattern recognition module 212. The powertrain controller 226 is configured to be in communication with the first controller 202 and the second controller 204 to control the speed of the engine 112 and the output speed of the variable speed member 119, respectively.

INDUSTRIAL APPLICABILITY

The present disclosure relates to the control system 200 and a method 300 for controlling at least one the speed of the engine 112 and the output speed of the variable speed member 119 for any machine that performs a substantially repetitive work cycle. The control system 200 may enhance performance of the machine 100 by determining the total load acting on the machine 100 and the probability output of the current machine operating pattern with reference to the predefined machine operating patterns. The first controller 202 and the second controller 204 may be selectively actuated based on the determined error output, the gain factors and the weighting factors to control the speed of the engine 112 and the output speed of the variable speed member 119.

Figure 4:
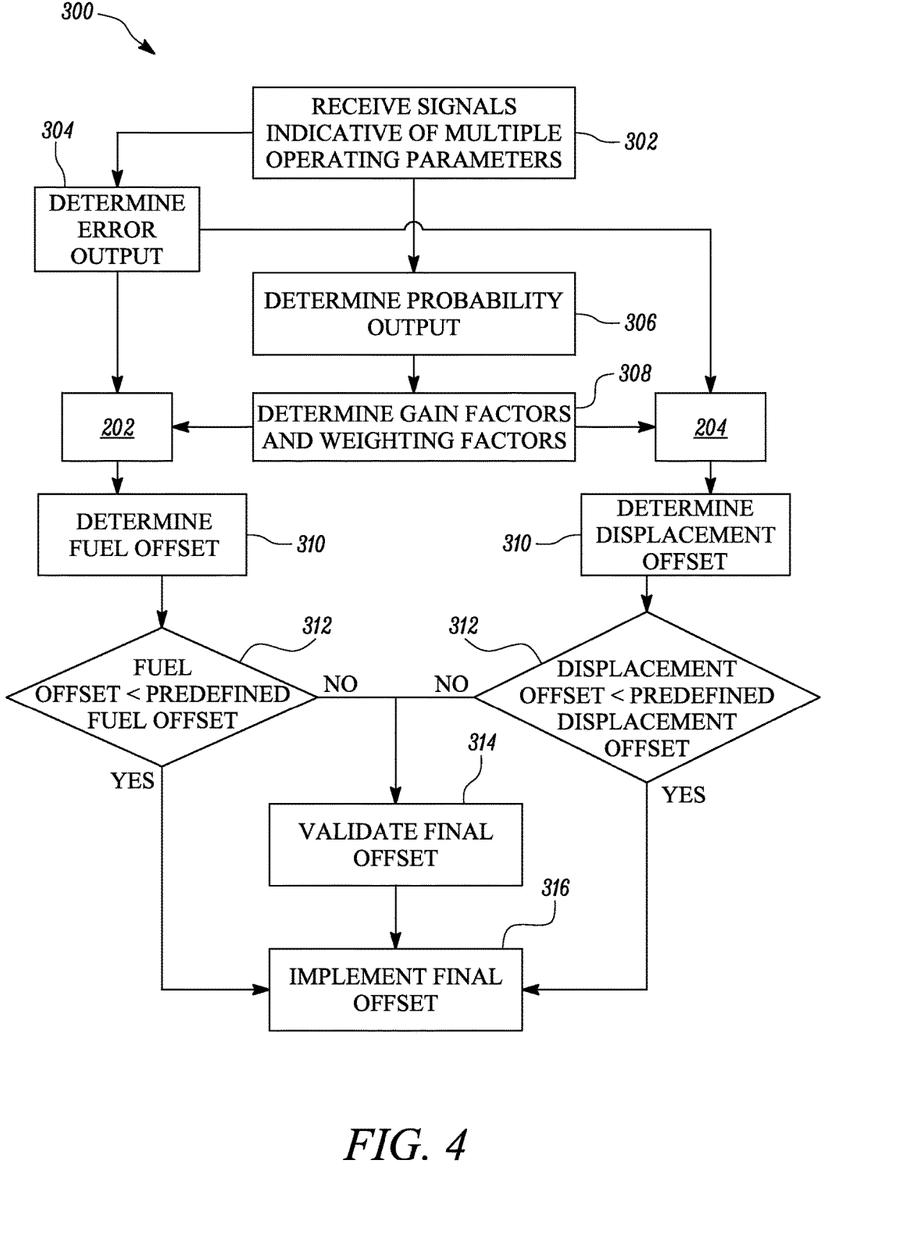
FIG. 4 is a flow chart of a method of controlling a speed of the engine and an output speed of the variable speed member, according to an embodiment of the present disclosure.

FIG. 4 is a flow chart illustrating the method 300 for controlling speed of the engine 112 and the output speed of the variable speed member 119, according to an embodiment of the present disclosure. At block 302, the method 300 includes receiving signals from the grade sensor 216, the load sensor 218, the engine sensor 220 and the transmission sensor 222 indicative of the various operating parameters of the machine 100 including, but not limited to, the amount of material contained in the bucket 104, inclination of the ground surface 116, travel direction of the machine 100, the current setting of the variable speed member 119 including the speed of the variable speed member 119, the actual speed of the engine 112, and current fuel setting. In an example, the signals corresponding to the multiple operating parameters may be received at the time $T_0$. In various embodiments, additional engine sensors and transmission sensors may also be used for receiving signals indicative of aforesaid operating parameters and any other operating parameters. Further, a desired speed of the engine 112 may also be set in the control system 200. In an example, the control system 200 may include a memory device (not shown) for storing the desired speed of the engine 112 and the predefined machine operating patterns. The memory device may also be used for storing various inputs and outputs of the control system 200. The pattern recognition module 212 receives the signals from the grade sensor 216, the load sensor 218, the engine sensor 220 and the transmission sensor 222, and determines the current machine operating pattern at time $T_0$ based on the multiple operating parameters of the machine 100.

Further, the powertrain controller 226 may be configured to determine the load acting on the machine 100 that must be overcome by the transmission system 118 in order to move the machine 100 without causing undesired speed deviations in the engine 112. In an embodiment, the load acting on the machine 100 may be affected by the grade of the ground surface 116 and/or travel direction of the machine 100. In an example, the load acting on the machine 100 may increase when the machine 100 is moving up the steep grade, and decrease when moving down the steep grade. Thus, the adaptive adjustment module 210 may be configured to receive the signals from the grade sensor 216 and the load sensor 218 to determine a total load acting on the machine 100.

At block 304, the method 300 includes determining an error output based on the actual speed of the engine 112 and the desired speed of the engine 112. The actual speed of the engine 112 may correspond to the speed of the engine 112 measured at time $T_0$. The error output is a difference between the actual speed of the engine 112 and the desired speed of the engine 112.

The adaptive adjustment module 210 may be further configured to compare the current machine operating pattern with the plurality of predefined machine operating patterns stored in the control system 200. Once the pattern recognition module 212 determines that the current machine operating pattern matches with one of the predefined machine operating patterns, the powertrain controller 226 may control the fuel governor of the engine 112 and the variable speed member 119 based on the determined current machine operating pattern. In an example, the powertrain controller 226 may distribute the load acting on the machine 100 among the engine 112 and the variable speed member 119. Further, the powertrain controller 226 may determine which of the engine 112 and the variable speed member 119 may respond first to the change in the load. Alternatively, the powertrain controller 226 may also determine that the engine 112 and the variable speed member 119 may simultaneously respond to the change in the load. Controlling the response of the engine 112 and the variable speed member 119 is described in detail hereinafter.

At block 306, the method 300 includes determining a probability of the current machine operating pattern matching with any of the plurality of predefined machine operating patterns. In some situations, the current machine operating pattern may match with any of the plurality of predefined machine operating patterns. However, in some other situations, the current machine operating pattern may not match with any of the plurality of predefined machine operating patterns. In such a case, the adaptive adjustment module 210 may be configured to determine the probability of the current machine operating pattern matching with any of the plurality of predefined machine operating patterns. Further, a probability output may be determined based on the probability of the current machine operating pattern matching with any of the plurality of predefined machine operating patterns. The probability output may indicate how well the current machine operating pattern matches with any of the plurality of predefined machine operating patterns.

At block 308, the method 300 includes determining gain factors and weighting factors based on the determined probability output. In an example, the first controller 202 and the second controller 204 associated with the engine 112 and the variable speed member 119, respectively, may be a PI controller. The determined gain factors and the weight factors may be communicated to the first controller 202 and the second controller 204. The gain factors may be adjusted for controlling stability and response time of the first controller 202 and the second controller 204. The method 300 further includes controlling the speed of the engine 112 and the output speed of the variable speed member 119 by determining a response time for the first controller 202 and the second controller 204 based on the gain factors.

In an example, the powertrain controller 226 may actuate the variable speed member 119 via the second controller 204 to quickly respond to the change in the load based on the error output and the gain factors by reducing displacement of the hydraulic pump 132. At the same time, the powertrain controller 226 may actuate the fuel governor via the first controller 202 to respond to change in load slowly based on the error output and the gain factor. The powertrain controller 226 may also suspend the fuel governor for a desired period of time before the fuel governor responds to the error output that is already adjusted by controlling the output speed of the variable speed member 119.

In another example, the powertrain controller 226 may actuate the fuel governor via the first controller 202 to respond to the change in load quickly by supplying fuel in the engine 112 based on the error output and the gain factors. At the same time, the powertrain controller 226 may actuate the variable speed member 119 via the second controller 204 to respond to the change in load slowly or suspend the variable speed member 119 for a desired period of time before the variable speed member 119 responds to the error output that is already adjusted by controlling the speed of the engine 112. Such communication between the first controller 202 and the second controller 204 may avoid responding of both the engine 112 and the variable speed member 119 simultaneously.

At block 310, the method 300 includes determining a fuel offset and a displacement offset based on the determined error output, the gain factors and the weighting factors. The fuel offset may correspond to a change in quantity of fuel required to be supplied to the engine 112 based on the current setting of fuel, the error output, the gain factors and the weighting factors. Similarly, the displacement offset may correspond to a change in displacement of the hydraulic pump 132 required to control the speed of the variable speed member 119 based on the current setting of the displacement of the hydraulic pump 132, the error output, the gain factors and the weighting factors. In various embodiments, the weighting factors determined at time $T_0$ may be different for determining the fuel offset and the displacement offset.

In an example, the fuel offset may be determined based on the following equation:

$$\text{Fuel Offset}_{final} = W_0 * F_0$$

wherein:

Fuel Offset$_{final}$ is the total change to current fueling required at time $T_0$ that should accommodate the current speed deviation at given current conditions;

$W_0$ is the weighting factor determined at time $T_0$ based on the probability output; and $F_0$ is the error output based fuel value for time $T_0$ given the current total load determined based on the gain factors.

In another example, the displacement offset may be determined based on the following equation:

$$\text{Displacement Offset}_{final} = Q_0 * D_0$$

wherein:

Displacement Offset$_{final}$ is the total change to current hydraulic pump displacement required at time $T_0$ that should accommodate the current speed deviation given current conditions;

$Q_0$ is the weighting factor determined at time $T_0$ based on the probability output; and $D_0$ is the error output based hydraulic pump displacement value for time $T_0$ given the current total load determined based on the gain factors.

The adaptive adjustment module 210 may adjust response time of the first controller 202 and the second controller 204 by assigning weighting factors and/or gain factors to the first and second controllers 202, 204 according to the probability output. If the current machine operating pattern does not match any of the predetermined machine operating patterns of the work cycle or the probability output is below a threshold (e.g. 50%), the adaptive adjustment module 210 may assign the default gain factors and weighting factors (e.g 50% to the first controller 202 and 50% to the second controller 204) to the first and second controllers 202, 204. In an example, the adaptive adjustment module 210 may allow one of the first and second controllers 202, 204 to respond quickly by assigning more aggressive gain factors, which is predetermined during powertrain calibration, to that controller. The adaptive adjustment module 210 may also suspend another of the first and second controllers 202, 204 for a desired period of time before that controller responds to the error output by assigning zero weighting factor to that controller at time $T_0$.

At block 312, the method 300 includes comparing the fuel offset and the displacement offset with reference to a predefined fuel offset and a predefined displacement offset, respectively. In an embodiment, the predefined fuel offset may include a fuel limit and a smoke limit. The smoke limit may correspond to an air-fuel ratio associated with the engine 112. For a given amount of air in the cylinder, the smoke limit establishes maximum amount of fuel that can be burned per stroke. Further, the predefined displacement offset may include a hardware limit and a slope limit. The hardware limit and the slope limit may correspond to various limitations of the hydraulic elements of the variable speed member 119. The predefined fuel offset and the predefined displacement offset may be stored in the control system 200 in the form of, for example, a 2D map and a lookup table. The predefined fuel offset and the predefined displacement offset may be referred as the predefined maximum fuel offset and the predefined maximum displacement offset, respectively.

If the final fuel offset and the displacement offset are less than the maximum of the predefined fuel offset and the maximum of the predefined displacement offset, then the fuel offset and the displacement offset may be determined as a validated fuel offset and a validated displacement offset, respectively, and may be implemented as shown at block 316. In such a case, the final fuel offset and the final displacement offset may not require further modification. If the fuel offset and the displacement offset are greater than the predefined fuel offset and the predefined displacement offset, respectively, then maximum of the fuel offset and the displacement offset stored in the control system 200, such as in a predetermined map may become a validated offset as shown at block 314, and may be implemented as shown at block 316.

At block 316, the method 300 includes controlling at least one of the speed of the engine 112 and the output speed of the variable speed member 119 based on the validated final offset. In an embodiment, the validated final offset may be communicated with the fuel governor of the engine 112 to control the speed of the engine 112 based on the load acting on the engine 112 and the probability output of the current machine operating pattern. In another embodiment, the validated final offset may be communicated with the second controller 204 to control the displacement of the hydraulic pump 132 by adjusting the angular position of the variable swash plate 136.

Figure 5:
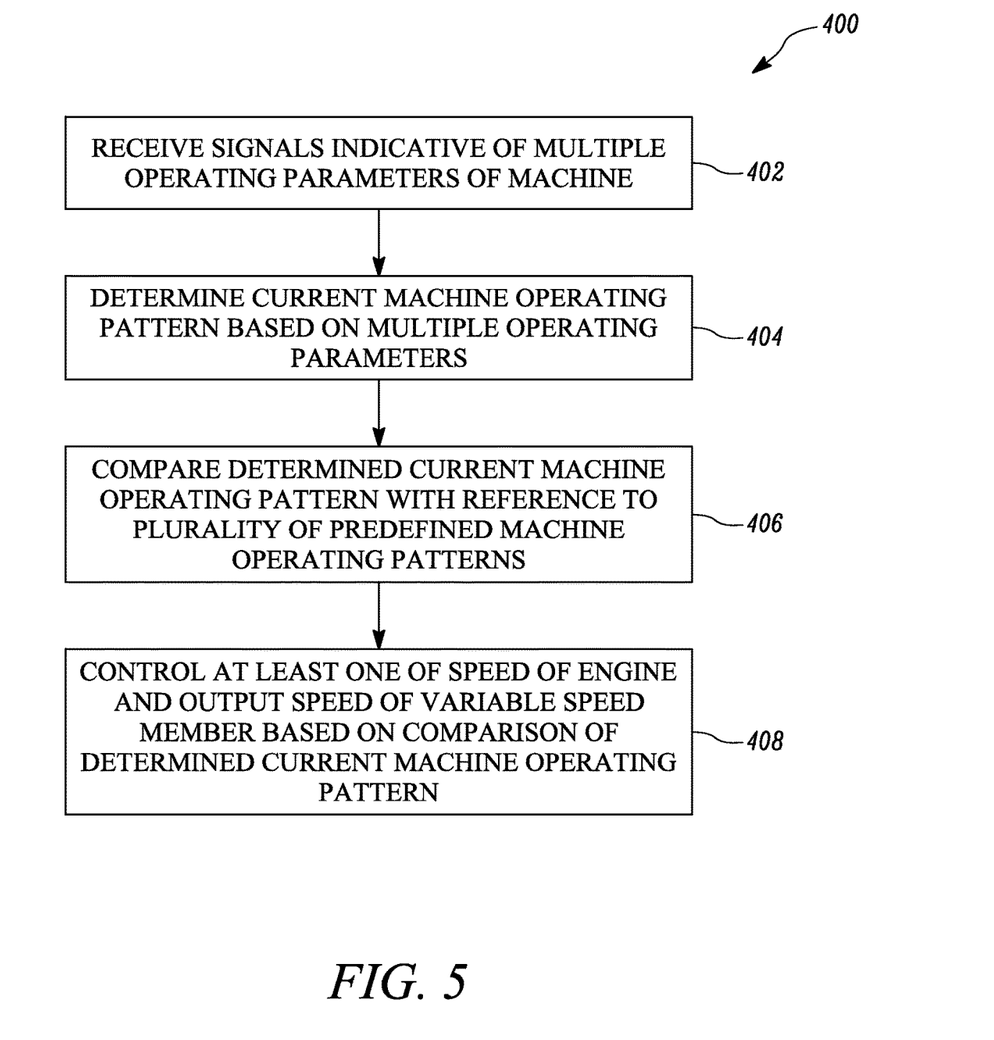
FIG. 5 is a flow chart of a method of controlling the speed of the engine and the output speed of the variable speed member, according to another embodiment of the present disclosure.

FIG. 5 is a flow chart of a method 400 of controlling the speed of the engine 112 and the output speed of the variable speed member 119, according to another embodiment of the present disclosure. At block 402, the method 400 includes receiving signals indicative of multiple operating parameters of the machine 100 at time $T_0$. The grade sensor 216, the load sensor 218, the engine sensor 220 and the transmission sensor 222 generate signals indicative of various operating parameters of the machine 100 as described above. The adaptive adjustment module 210 in communication with the grade sensor 216, the load sensor 218, the engine sensor 220 and the transmission sensor 222 receives signals therefrom. The desired speed of the engine 112 and the predefined plurality of machine operating patterns may also be stored in the adaptive adjustment module 210. The adaptive adjustment module 210 may further determine the load acting on the machine 100 based on the signals received from the grade sensor 216 and the load sensor 218.

At block 404, the method 400 includes determining the current machine operating pattern based on the multiple operating parameters. The adaptive adjustment module 210 may determine the current machine operating pattern at time $T_0$ based on the multiple operating parameters. The current machine operating pattern may be one of the dig segment, the lift segment, the move up a steep grade, the swing movement, the dump segment, the move down a steep grade and another swing movement.

At block 406, the method 400 includes comparing the determined current machine operating pattern with reference to the plurality of predefined machine operating patterns. In some situations, the current machine operating pattern may match with any of the plurality of predefined machine operating patterns. However, in some other situations, the current machine operating pattern may not match with any of the plurality of predefined machine operating patterns. In such a case, the adaptive adjustment module 210 may determine the probability of the current machine operating pattern matching with any of the plurality of predefined machine operating patterns.

At block 408, the method 400 includes controlling at least one of the speed of the engine 112 and the output speed of the variable speed member 119 based on the comparison of the current machine operating pattern with reference to the plurality of predefined machine operating patterns stored in the adaptive adjustment module 210. The current machine operating pattern may be compared with the plurality of predefined machine operating patterns to determine the probability output. In an embodiment, the method 400 includes determining the gain factors and weighting factors based on the determined probability output. The determined gain factors, the weight factors and the error output are communicated to the first controller 202 and the second controller 204. The speed of the engine 112 and the output speed of the variable speed member 119 may be controlled by determining the response time for the first controller 202 and the second controller 204 based on the gain factors. Further, the fuel offset and the displacement offset are also determined based on the determined error output, the gain factors and the weighting factors. Thus at least one of the speed of the engine 112 and the variable speed member 119 may be controlled by controlling the amount of fuel supplied to the engine 112 and the displacement of the hydraulic pump 132, respectively, based on the probability output of the current machine operating pattern.

In an example, at time $T_0$, the control system 200 may determine that the current machine operating pattern is the segment of moving up a steep grade. The machine operating pattern may be determined based on the previous machine operating patterns stored in the period $T_{-5}$ to $T_0$. Since a speed of the machine 100 may be perceived by the operator, the control system 200 may actuate the second controller 204 to respond to change in load as quickly as possible. The second controller 204 may change a ratio of the variable speed member 119 from a high-speed output to a low speed output. When the ratio changes from the high-speed output to the low speed output, the second controller 204 may decrease flow of hydraulic fluid supplied to the hydraulic motor 134 by decreasing the displacement of the hydraulic pump 132 to reduce a torque load or a power load of the engine 112. When the variable speed member 119 keeps the engine 112 operating at the desired speed of the engine 112, the efficiency of the engine 112 may be maximized during transient event of shifting from one segment to the other segment. As the ratio of the variable speed member 119 shifts to a limit, available ground speed may be limited. If there is still power margin, for example, the engine 112 does not operate at rated power, the operator may increase power of the engine 112 to increase speed of the machine 100 via a pedal or manual control devices. If the speed of the machine 100 is set constant, then the control system 200 may automatically adjust the fuel governor to supply fuel after the second controller 204 actuates to respond to the error output.

In another example, at time $T_0$, the control system 200 may determine that the current machine operating pattern is dig segment. In such a case, the control system 200 may actuate the first controller 202 to respond to the change in load as quick as possible by setting the gain factors. The load change in the dig segment is hard to be perceived by the operator. Further, frequent load changes also make manual controlling tedious. The second controller 204 maintains the displacement of the hydraulic pump 132 constant in the dig segment to improve efficiency of the work cycle.

With the adaptive adjustment module 210, different response time for the first controller 202 and the second controller 204 may be determined to control the speed of the engine 112 and the speed of the variable speed member 119, respectively, based on the type of current machine operating pattern. Thus overacting of the fuel governor and the variable speed member 119 may be avoided. By improving the efficiency of the transmission system 118, CO2 emission from the machine 100 may also be reduced.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of controlling a machine, the method comprising:
   receiving signals indicative of multiple operating parameters of the machine;
   determining a current machine operating pattern based on the multiple operating parameters;
   comparing the determined current machine operating pattern with a plurality of predefined machine operating patterns;
   determining gain factors and weighting factors based on a probability of the determined current machine operating pattern matching the plurality of predefined machine operating patterns; and
   controlling at least one of a speed of an engine and an output speed of a variable speed member based on the comparison of the determined current machine operating pattern,
      wherein the variable speed member is drivably coupled to the engine of the machine.

2. The method of claim 1 further comprising determining an error output based on an actual speed of the engine and a desired speed of the engine.

3. The method of claim 2 further comprising communicating the determined error output, the gain factors and the weighting factors with a first controller configured to be in communication with the engine and a second controller configured to be in communication with the variable speed member,
   wherein the at least one of the speed of the engine and the output speed is controlled based on the gain factors and the weighting factors.

4. A control system for a machine, the control system comprising:
   a first controller in communication with an engine,
      the first controller configured to control a speed of the engine based on supply of fuel;
   a second controller in communication with a variable speed member,
      the second controller configured to control an output speed of the variable speed member, wherein the variable speed member is drivably coupled to the engine; and
   a memory including an adaptive adjustment module configured to be in communication with the first controller and the second controller,
      the adaptive adjustment module configured to:
         receive signals indicative of multiple operating parameters of the machine;
         determine a current machine operating pattern based on the multiple operating parameters;
         compare the determined current machine operating pattern with a plurality of predefined machine operating patterns;
         determine gain factors and weighting factors based on a probability of the determined current machine operating pattern matching with the plurality of predefined machine operating patterns; and
         control at least one of the speed of the engine and the output speed of the variable speed member based on the gain factors and weighting factors.

5. The control system of claim 4, wherein the adaptive adjustment module comprises:
   a pattern recognition module configured to receive signals indicative of the multiple operating parameters of the machine,
      the pattern recognition module configured to determine the current machine operating pattern and a load acting on the machine based on the multiple operating parameters; and
   a powertrain controller in communication with the pattern recognition module,
      the powertrain controller configured to be in communication with the first controller and the second controller.

6. The control system of claim 5, wherein the pattern recognition module is configured to be in communication with:
   at least a grade sensor configured to generate signals indicative of a position of the machine relative to a ground surface; and
   at least a load sensor configured to generate signals indicative of a load carried by the machine.

7. The control system of claim 5, wherein the pattern recognition module is further configured to be in communication with:
   at least an engine sensor configured to generate signals indicative of an actual speed of the engine; and
   at least a transmission sensor configured to generate signals indicative of an actual output speed of the variable speed member.

8. The control system of claim 7, wherein the adaptive adjustment module is configured to determine an error output,
   wherein the error output is a difference of an actual engine speed and a desired engine speed.

9. The control system of claim 8, wherein the adaptive adjustment module is further configured to communicate the determined error output, the gain factors and the weighting factors with the first controller and the second controller to control the speed of the engine and the output speed of the variable speed member, respectively.

10. A machine comprising:
    an engine;
    a transmission system drivably coupled to the engine, the transmission system comprising a variable speed member coupled parallel to the engine; and
    a control system comprising:

a first controller in communication with the engine, the first controller configured to control a speed of the engine based on supply of fuel;

a second controller in communication with the variable speed member, the second controller configured to control an output speed of the variable speed member; and a memory including an adaptive adjustment module configured to be in communication with the first controller and the second controller, the adaptive adjustment module configured to:

receive signals indicative of multiple operating parameters of the machine;

determine a current machine operating pattern based on the multiple operating parameters;

compare the determined current machine operating pattern with a plurality of predefined machine operating patterns;

determine gain factors and weighting factors based on a probability of the determined current machine operating pattern matching the plurality of predefined machine operating patterns; and control at least one of the speed of the engine and the output speed of the variable speed member based on the comparison of the determined current machine operating pattern.

11. The machine of claim 10, wherein the adaptive adjustment module comprises:

a pattern recognition module configured to receive signals indicative of the multiple operating parameters of the machine, the pattern recognition module configured to determine the current machine operating pattern and a load acting on the machine based on the multiple operating parameters; and a powertrain controller in communication with the pattern recognition module, the powertrain controller configured to be in communication with the first controller and the second controller.

12. The machine of claim 11, wherein the pattern recognition module is configured to be in communication with:

at least a grade sensor configured to generate signals indicative of a position the machine relative to a work surface;

at least a load sensor configured to generate signals indicative of a load carried by the machine;

at least an engine sensor configured to generate signals indicative of an actual speed of the engine; and a transmission sensor configured to generate signals indicative of an actual output speed of the variable speed member.

13. The machine of claim 10, wherein the adaptive adjustment module is configured to determine an error output based on a difference of an actual engine speed and a desired engine speed, and communicate the determined error output, the gain values and the weighting factors with the first controller and the second controller to control the speed of the engine and the output speed of the variable speed member.

* * * * *